US012617724B2

(12) United States Patent
Boustingorry et al.

(10) Patent No.: US 12,617,724 B2
(45) Date of Patent: May 5, 2026

(54) HYDRAULIC BINDER COMPOSITION COMPRISING BLAST FURNACE SLAG

(71) Applicant: CHRYSO, Courbevoie (FR)

(72) Inventors: Pascal Boustingorry, Breuillet (FR); Laurent Bonafous, Sevres (FR)

(73) Assignee: STARCIN HOLDING FRANCE, Courbevoie (FR)

( * ) Notice: Subject to any disclaimer, the term of this patent is extended or adjusted under 35 U.S.C. 154(b) by 315 days.

(21) Appl. No.: 18/262,665

(22) PCT Filed: Jan. 25, 2022

(86) PCT No.: PCT/EP2022/051622
§ 371 (c)(1),
(2) Date: Jul. 24, 2023

(87) PCT Pub. No.: WO2022/157386
PCT Pub. Date: Jul. 28, 2022

(65) Prior Publication Data

US 2024/0092695 A1 Mar. 21, 2024

(30) Foreign Application Priority Data

Jan. 25, 2021 (FR) ........................................ 2100670

(51) Int. Cl.

| | |
|---|---|
| ***C04B 28/08*** | (2006.01) |
| ***C04B 24/26*** | (2006.01) |
| ***C04B 28/26*** | (2006.01) |
| ***C04B 40/00*** | (2006.01) |
| ***C04B 103/30*** | (2006.01) |
| ***C04B 111/10*** | (2006.01) |

(52) U.S. Cl.
CPC .............. *C04B 28/08* (2013.01); *C04B 24/26* (2013.01); *C04B 28/26* (2013.01); *C04B 40/0039* (2013.01); *C04B 2103/308* (2013.01); *C04B 2111/1037* (2013.01)

(58) Field of Classification Search
CPC ..... C04B 28/006; C04B 22/124; C04B 28/08; C04B 28/04; C04B 28/065; C04B 28/14; C04B 28/26; C04B 40/0039; C04B 24/2647; C04B 24/04; C04B 24/26; C04B 2111/1037; C04B 2103/308; C04B 18/141
See application file for complete search history.

(56) References Cited

U.S. PATENT DOCUMENTS

| | | | |
|---|---|---|---|
| 9,656,918 B2 * | 5/2017 | Kuryatnyk .............. | C04B 28/14 |
| 2005/0215671 A1 | 9/2005 | Gonnon et al. | |
| 2015/0158768 A1 | 6/2015 | Gdt et al. | |
| 2020/0231503 A1 | 7/2020 | Dubey et al. | |

FOREIGN PATENT DOCUMENTS

WO 2019077050 A1 4/2019

OTHER PUBLICATIONS

Search Report for FR Application No. 2100670 dated Oct. 22, 2021, 2 pages.
International Search Report for PCT/EP2022/051622 dated May 3, 2022, 4 pages.
Written Opinion of the ISA for PCT/EP2022/051622 dated May 3, 2022, 6 pages.

* cited by examiner

*Primary Examiner* — Zakiya W Bates
(74) *Attorney, Agent, or Firm* — NIXON & VANDERHYE

(57) ABSTRACT

A hydraulic binder composition comprising: a hydraulic binder including at least one alumino-silicate compound, for example blast furnace slag, and an alkaline or sulfate activator and a maximum of 10 wt % of clinker, preferably between 0 and 10 wt % of clinker; a guanidine salt and/or a zinc salt; and a polymer.

20 Claims, No Drawings

HYDRAULIC BINDER COMPOSITION COMPRISING BLAST FURNACE SLAG

CROSS-REFERENCE TO RELATED APPLICATIONS

This application is the US national stage of PCT/EP2022/051622, filed Jan. 25, 2022, which claims the priority of FR Patent Application No. 2100670, filed Jan. 25, 2021. The entire contents of each foregoing application are incorporated herein by reference.

BACKGROUND OF THE INVENTION

Field of the Invention

The present invention relates to a hydraulic binder composition comprising at least one alumino-silicate compound, and an alkaline or sulphate activator, and a reduced quantity of clinker, and to the retention of workability of the hydraulic composition obtained, in particular by the adding of water to the hydraulic binder composition.

Description of the Related Art

Common cementitious compositions comprise a variable, sometimes high proportion of clinker. For example, a cementitious composition according to the standard NF EN 197-1 of 2012 comprises from 5 to 95% by weight of clinker.

However, the manufacture of clinker requires the use of powerful kilns, thus resulting in the emission of large quantities of carbon dioxide. The extraction of raw materials is also a source for discharging carbon dioxide emissions.

It is therefore sought to lower the clinker content of cementitious compositions in order to reduce the carbon impact thereof, while however maintaining the mechanical and rheological properties thereof.

To this end, new hydraulic binder compositions have been developed in which the amount of clinker is reduced.

Cementitious compositions in which the hydraulic binder is a blast furnace slag have been previously disclosed, these compositions are generally activated. However, there is a very rapid drop in the workability of these compositions, which is to say that they go from a fluid to an almost solid state in less than 30 minutes. From a rheological standpoint, threshold stresses of 1 to 10 Pa are typically observed five minutes after mixing, with the values increasing to 50 to 100 Pa between 30 and 60 minutes after mixing.

There is therefore an interest in providing a solution which makes it possible to enhance the fluidity of compositions that comprise at least one alumino-silicate compound, for example blast furnace slag, and an alkaline or sulphate activator.

SUMMARY OF THE INVENTION

One objective of the present invention is to provide a composition comprising at least one alumino-silicate compound, for example blast furnace slag, and an alkaline or sulphate activator which makes it possible to obtain a hydraulic composition that exhibits enhanced retention of fluidity.

Another object of the present invention is to provide such a composition that serves to enable fluidity to be retained for a period of 1 hour or 1 hour and 30 minutes.

Other additional objectives will also become apparent upon reading the description of the invention which follows.

All of these objectives are achieved in the present application which relates to a hydraulic binder composition (HBC) comprising:

- a hydraulic binder that comprises at least one alumino-silicate compound, for example blast furnace slag, and an alkaline or sulphate activator and a maximum of 10% by weight of clinker, preferably from 0 to 10% by weight of clinker;
- a guanidine salt and/or a zinc salt;
- a polymer (P) comprising units having the following formulae (I) and (II):

(I)

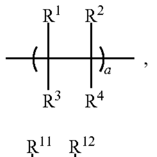

(II)

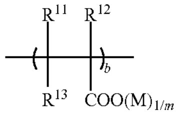

in which:

- $R^1$ and $R^2$ independently represent a hydrogen or a methyl;
- $R^3$ represents a hydrogen or a group having the formula —$COO(M)_{1/m}$;
- $R^4$ represents a group having the formula —$(CH_2)_p$—$(OAlk)_q$-$R_5$ in which:
- p represents 1 or 2;
- q represents an integer from 3 to 300;
- the Alk of each OAlk unit of the group —$(OAlk)_q$- independently represents a linear or branched alkylene containing from 2 to 4 carbon atoms;
- $R^5$ represents —OH or a linear or branched alkoxyl containing from 1 to 4 carbon atoms;
- $R^{11}$ and $R^{12}$ independently represent a hydrogen or a methyl;
- $R^{13}$ represents a hydrogen or a group having the formula —$COO(M)_{1/m}$;
- M represents H or a cation of valency m;
- when M represents H, m represents 1, and when M represents a cation, m is the valency of the cation M;
- a is a number from 0.05 to 0.25, such that (100×a) represents the molar percentage of units having the formula (I) within the polymer, and
- b is a number from 0.75 to 0.95, such that (100×b) represents the molar percentage of units having the formula (II) within the polymer.

In an advantageous manner the inventors have shown that the adding of guanidine salt and/or zinc salt, and polymer (P) according to the invention provides the means for enhancing the retention of fluidity (also referred to as retention of workability) over time, of a hydraulic composition prepared from the hydraulic binder composition (HBC), in particular by adding at least water, as compared to a composition that does not contain any guanidine salt, zinc salt and polymer (P) according to the invention.

In the context of the present invention, the enhancement in the retention of workability, as measured, for example, by the evolving change in the threshold stress of a hydraulic composition obtained from the composition HBC, in particular by adding of water, over time, is preferably long-term, that is to say over a period greater than or equal to 45 minutes, in particular greater than 60 minutes, or indeed even greater than 90 minutes when the composition is used at 20° C. It is therefore desirable to have threshold stresses of the order of 1 to 10 Pa over the same time intervals, that is to say over a period greater than or equal to 45 minutes, in particular greater than 60 minutes, or indeed even greater than 90 minutes when the composition is used at 20° C.

The threshold stress may in particular be measured by means of a rheometer by performing a number of measurements of the stress applied in order to obtain each corresponding strain rate value. The value of applied stress below which the strain rate becomes very low or zero may be considered to be the threshold stress.

The hydraulic binder composition (HBC) may be free of clinker.

Blast furnace slag is defined in particular in parts 3.7 and 3.6 of the standard NF EN 15167-1. Blast furnace slags are predominantly vitreous materials and are by-products of the cast iron production process. Blast furnace slags used in hydraulic binder compositions are finely ground, preferably to a maximum diameter of 100 to 150 μm, the diameter being measured by any suitable method known to the person skilled in the art, for example by laser granulometry. Blast furnace slags generally require calcium or sulpho-calcium activation or activation using a strong base.

Thus, the hydraulic binder composition (HBC) of the invention comprises an alkaline or sulphate activator for alumino-silicate compounds, in particular blast furnace slag; preferably a calcium or sulphate activator, preferably a sulpho-calcium activator; or an alkaline salt, preferably a sodium or potassium carbonate, hydroxide or silicate, or mixtures thereof; or a calcium sulphate activator. This activator is used preferably in proportions of from 0.1 to 20% by dry weight relative to the total weight of hydraulic binder, preferably from 1% to 20% by dry weight relative to the total weight of hydraulic binder.

The activator may also be present in an amount equal to 0 to 10% by dry weight relative to the weight of the hydraulic binder.

Hydraulic binder compositions comprising blast furnace slag and calcium sulphate, in particular in a proportion of 5 to 20% by weight, are also referred to as super sulphated cement (SSC) and are in particular as defined in the standard NF EN 15743+A1.

Preferably, the hydraulic binder composition (HBC) according to the invention comprises a hydraulic binder comprising at least one alumino-silicate compound, for example blast furnace slag; an activator, preferably calcium or sulfate activator, preferably sulfo-calcium activator, or an alkaline salt; and a maximum of 10% by weight of clinker, preferably from 0 to 10% by weight of clinker.

In the context of the present invention, the term "alumino-silicate compound" is used to refer to fly ash (as defined in the standard Cement NF EN 197-1 (2012) paragraph 5.2.4), metakaolins, such as type A metakaolins compliant with the standard NF P 18-513 (August 2012) or calcined clays, alumino-silicates in particular of the inorganic geopolymer type.

The composition of the invention may comprise a mixture of alumino-silicate compounds.

Preferably, the hydraulic binder consists of an alumino-silicate compound and an alkaline or sulphate activator. Preferably, the hydraulic binder consists of a blast furnace slag and an alkaline or sulphate activator.

The hydraulic binder may also comprise mineral additives, in an amount preferably from 0 to 10% by weight relative to the total weight of hydraulic binder.

The term "mineral additives" is used to refer to pozzolanic materials (as defined in the standard Cement NF EN 197-1 (2012) paragraph 5.2.3), calcined shales (as defined in the standard Cement NF EN 197-1 (2012) paragraph 5.2.5), limestone (as defined in the standard Cement NF EN 197-1 (2012) paragraph 5.2.6), or even silica fumes (as defined in the standard Cement NF EN 197-1 (2012) paragraph 5.2.7), or mixtures thereof. Other additives, not currently recognised in the standard Cement NF EN 197-1 (2012), may also be used. These include silica additives, such as silica additives having quartz (Qz) mineralogy, compliant with the standard NF P 18-509 (September 2012). The proportions of additives and the nature thereof may also comply with the standard prEN 197-5, which defines Portland-composite cements CEM II/C-M comprising between 50 and 64% clinker and from 36 to 50% blast furnace slag, and composite cement CEM VI containing from 35 to 49% clinker, from 31 to 59% blast furnace slag furnace, and from 6 to 20% of mineral additives as defined above.

Preferably, the alumino-silicate compound is a blast furnace slag and the hydraulic binder may also comprise mineral additives. The term "mineral additives" is used to refer to pozzolanic materials (as defined in the standard Cement NF EN 197-1 (2012) paragraph 5.2.3), fly ash (as defined in the standard Cement NF EN 197-1 (2012) paragraph 5.2.4), calcined shales (as defined in the standard Cement NF EN 197-1 (2012) paragraph 5.2.5), limestone (as defined in the standard Cement NF EN 197-1 (2012) paragraph 5.2.6), or even silica fumes (as defined in the standard Cement NF EN 197-1 (2012) paragraph 5.2.7), or mixtures thereof. Other additives, not currently recognised in the standard Cement NF EN 197-1 (2012), may also be used. These include metakaolins, such as type A metakaolins compliant with the standard NF P 18-513 (August 2012) or calcined clays; silica additives, such as silica additives having quartz (Qz) mineralogy, compliant with the standard NF P 18-509 (September 2012); alumino-silicates, in particular of the inorganic geopolymer type. The proportions of additives and the nature thereof may also comply with the standard prEN 197-5, which defines Portland-composite cements CEM II/C-M comprising between 50 and 64% clinker and from 36 to 50% blast furnace slag, and composite cement CEM VI containing from 35 to 49% clinker, from 31 to 59% blast furnace slag furnace, and from 6 to 20% of mineral additives as defined above.

Thus, in the context of the present invention, the hydraulic binder comprises: blast furnace slag, optionally a slag activator as defined above, optionally clinker, and optionally mineral additives as described above.

Preferably, the hydraulic binder composition comprises from 75 to 99% by weight of alumino-silicate compound, preferably from 80 to 95% by weight, for example from 80 to 90% by weight, relative to the total weight of hydraulic binder.

In an advantageous manner, the guanidine salt and/or zinc salt mixture and the polymer of the invention form a water-soluble solution and not a suspension. In an advantageous manner, this enables ease of use thereof in hydraulic binder compositions.

In one embodiment, the HBC composition comprises a guanidine salt.

In another embodiment, the HBC composition comprises a zinc salt.

In a final embodiment, the HBC composition comprises a guanidine salt and a zinc salt.

The amount of guanidine salt and/or zinc salt in the hydraulic binder composition (HBC) is between 0.1 and 5% by dry weight, preferably between 1.0 and 2.5% by dry weight, relative to the total weight of hydraulic binder.

The guanidine salt may be selected from guanidine thiocyanate, guanidine acetate and guanidine nitrate.

The zinc salt may be selected from zinc chloride and zinc nitrate.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

Preferably, the HBC composition comprises from 0.1 to 3.0% by dry weight of polymer (P), preferably from 0.3 to 1.0% by dry weight of polymer (P), relative to the total weight of hydraulic binder.

In the context of the present invention, the term "total weight of hydraulic binder" is used to refer to the weight of: the alumino-silicate compounds, preferably blast furnace slag, the activator, the clinker if present, and the mineral additives if present.

The following embodiments for the formulae (I) and (II) of the units of the polymer (P) may be considered independently or combined together:

- $R^1$ represents H;
- $R^3$ represents H;
- $R^1$ and $R^3$ represent H;
- $R^2$ represents a methyl;
- p represents 1;
- Alk represents $—CH_2—CH_2—$, $—CH_2—CH_2—CH_2—$, $—CH_2—CH_2—CH_2—CH_2—$, $—CH_2—CHMe—$, $—CHMe—CH_2—$;
- at least 80% of the Alks of the group $—(OAlk)_q$- represent $—CH_2—CH_2—$, or even all of the Alks of the group $—(OAlk)_q$- represent $—CH_2—CH_2—$;
- q represents an integer from 5 to 200, in particular from 10 to 100, preferably from 25 to 75;
- $R^5$ represents —OH or —OMe, preferably $R^5$ represents —OH;
- the sum of a and b is 1;
- $R^{11}$ represents H;
- $R^{13}$ represents H;
- $R^{11}$ and $R^{13}$ represent H;
- $R^{12}$ represents H; and/or
- M represents H or a monovalent or bivalent cation, with m then representing 1 or 2, the monovalent cation preferably being selected from among an ammonium salt $NH4^+$, a primary, secondary, tertiary or quaternary ammonium cation and a cation of an alkali metal, such as a sodium, lithium or potassium ion, and the divalent cation preferably being a cation of an alkaline earth metal, such as a magnesium or calcium ion;
- a is a number from 0.05 to 0.20, preferably a represents a number between 0.10 and 0.20;
- b is a number from 0.80 to 0.95, preferably b represents a number between 0.80 and 0.90.

Preferably, the units having the formula (I) of the polymer (P) have the following formula (I'):

(I')

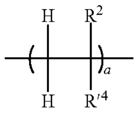

, in which:

- $R^2$ independently represents a hydrogen or a methyl, preferably a methyl;
- $R'^4$ represents a group having the formula $—CH_2—(O—CH_2—CH_2)_q—R_5$ in which:
  - q represents an integer from 3 to 500,
  - $R^5$ represents —OH or —OMe, preferably —OH;
- a is a number from 0.05 to 0.25, such that (100×a) represents the molar percentage of units having the formula (I') within the polymer (P).

Preferably, the units having the formula (II) of the polymer (P) have the following formula (II'):

(II')

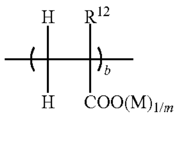

in which:

- $R^{12}$ represents a hydrogen or a methyl, preferably a hydrogen;
- M represents H or a cation of valency m;
- when M represents H, m represents 1, and when M represents a cation, m is the valency of the cation M;
- b is a number from 0.75 to 0.95, such that (100×b) represents the molar percentage of units having the formula (II') within the polymer.

Preferably, the polymer (P) comprises units having the formulae (I') and (II').

The following embodiments for the formulae (I') and (II') of the polymer (P) may be considered independently or combined with one another:

- q represents an integer from 5 to 200, in particular from 10 to 100, preferably from 25 to 75;
- $R^5$ represents —OH or —OMe, preferably $R^5$ represents —OH;
- a is a number from 0.05 to 0.20, preferably a represents a number between 0.10 and 0.20;
- b is a number from 0.80 to 0.95, preferably b represents a number between 0.80 and 0.90;
- the sum of a and b is 1 (which implies that the polymer is constituted of units having the formulae (I) and (II)); and/or
- M represents H or a monovalent or bivalent cation, with m then representing 1 or 2, the monovalent cation preferably being selected from among an ammonium salt $NH4^+$, a primary, secondary, tertiary or quaternary ammonium cation and a cation of an alkali metal, such as a sodium, lithium or potassium ion, and the divalent cation preferably being a cation of an alkaline earth metal, such as a magnesium or calcium ion.

The polymer (P) may comprise one or more additional unit(s) in addition to those having the formula (I) and (II). Preferably, the polymer (P) is free of units having the following formula (III):

(III)

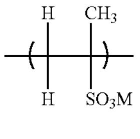

in which M represents H or a cation, such as sodium. In a particularly preferable manner, the polymer (P) is free of sulphonic acid and sulphonate groups.

Preferably, the polymer (P) is constituted of units having the formulae (I) and (II). It does not comprise any additional unit in addition to those having the formula (I) and (II). The sum of a and b is then 1.

The weight average molar mass of the polymer is generally from 10,000 to 200,000 g/mol, in particular from 10,000 to 100,000 g/mol.

Generally, the polymer (P) is obtained by means of free radical polymerisation.

The polymer (P) is therefore a comb polymer wherein the pendent groups are linked to the main carbon chain by ether groups.

The hydraulic binder composition (HBC) may also comprise polyalkoxylated polyphosphonate based polymers, preferably in a proportion of between 0.1 and 3.0% by dry weight relative to the total weight of hydraulic binder, optionally comprising mineral additives, preferably in a proportion from 0.3 to 1.0% by dry weight, in particular as described in the patent EP0663892 (for example CHRYSO®Fluid Optima 100).

In the context of the present invention, the polyalkoxylated phosphonate is preferably a polyalkoxylated phosphonate polymer having the formula (V) or one of the salts thereof, alone or as a mixture:

(V)

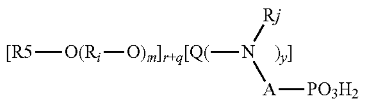

in which:

R5 is a hydrogen atom or a monovalent hydrocarbon group containing from 1 to 18 carbon atoms and optionally one or more heteroatoms;

the Ri are similar or different from each other and represent an alkylene such as ethylene, propylene, butylene, amylene, octylene or cyclohexene; or an arylene such as styrene or methylstyrene; the Ri optionally contain one or more heteroatoms;

Q is a hydrocarbon group containing from 2 to 18 carbon atoms and optionally one or more heteroatoms;

A is an alkylidene group containing from 1 to 5 carbon atoms; the $R_j$ are similar or different from each other and may be selected from among:

the group $A\text{-}PO_3H_2$, A having the previously noted definition;

the alkyl group containing from 1 to 18 carbon atoms and possibly bearing the groups $[R^5—O(R_i—O)_m]$, R5 and Ri having the previously noted definitions;

"m" is a number greater than or equal to 0;

"r" is the number of the groups $[R^5—O(R_i—O)_m]$ borne by all of the Rj;

"q" is the number of the groups $[R^5—O(R_i—O)_m]$ borne by Q;

the sum of "r+q" is between 1 and 10;

"y" is an integer between 1 and 3;

Q, N and the $R_j$'s may together form one or more rings, with the one or more rings possibly also containing one or more other heteroatoms.

In a particularly preferable manner, the polyalkoxylated phosphonate is constituted of a water-soluble or water-dispersible organic compound comprising at least one amino-di-(alkylene-phosphonic) group and at least one polyoxyalkylated chain or at least one of the salts thereof.

Preferably, the polyalkoxylated phosphonate is a compound having the formula (V) in which:

$R^5$ is a hydrogen atom or a monovalent hydrocarbon group, either saturated or un saturated, containing from 1 to 8 carbon atoms and optionally one or more heteroatoms;

the Ri represent ethylene or propylene or a mixture of ethylene or propylene, preferably 60 to 100% of the Ri are ethylene groups;

Q is a hydrocarbon group containing from 2 to 8 carbon atoms and, optionally, one or more heteroatoms;

A is the methylene group;

each of the Rj represents the group $CH_2—PO_3H_2$;

m is an integer between 10 and 250;

q is an integer equal to 1 or 2;

y is an integer equal to 1 or 2.

In particular, the polyalkoxylated phosphonate may be a polyalkoxylated phosphonate having the formula (V) in which R5 is a methyl group, the $R_i$ are ethylene and propylene groups, m being between 30 and 50, r+q equals to 1, Q is an ethylene group, A is a methylene group, y equals to 1, and $R_j$ corresponds to the group $CH_2—PO_3H_2$.

Preferably the hydraulic binder composition (HBC) according to the invention comprises from 0.1 to 5.0% by dry weight, preferably from 0.5 to 2.0% by dry weight of guanidine salt and/or zinc salt, and from 0.1 to 3.0% by dry weight of polymer (P), preferably from 0.3 to 1% by dry weight of polymer (P), relative to the total weight of hydraulic binder.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

The present application also relates to a hydraulic binder composition (HBC) comprising:

a hydraulic binder comprising blast furnace slag and a maximum of 10% by weight of clinker, preferably from 0 to 10% by weight of clinker;

a guanidine salt and/or a zinc salt;

a polymer (P) comprising units having the following formulae (I) and (II):

(I)

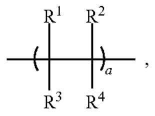

(II)

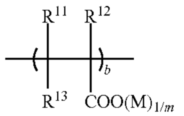

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q\text{-}R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

The elements described above concerning the hydraulic binder, the guanidine salt, the zinc salt, and the polymer (P) are also applicable.

The present invention also relates to an admixture composition (AC) comprising:

a guanidine salt and/or a zinc salt;

a polymer comprising units having the following formulae (I) and (II):

(I)

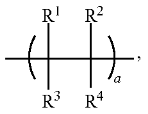

(II)

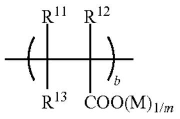

in which:

$R^1$ and $R^2$ independently represent a hydrogen or a methyl;

$R^3$ represents a hydrogen or a group having the formula —$COO(M)_{1/m}$;

$R^4$ represents a group having the formula —$(CH_2)_p$—$(OAlk)_q$-$R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

Preferably, the admixture composition of the invention comprises by dry weight, 1 part of polymer; between 0 and 4 parts, preferably between 1 and 4 parts, preferably between 1.5 and 2.5 parts, of guanidine salt; and between 0 and 5 parts, preferably between 1 and 5 parts, preferably between 2.5 and 3.5 parts of zinc salt.

Preferably, the admixture composition of the invention comprises, by dry weight, 1 part of polymer; between 1 and 4 parts, preferably between 1.5 and 2.5 parts, of guanidine salt; and between 1 and 5 parts, preferably between 2.5 and 3.5 parts of zinc salt.

In one embodiment, the admixture composition comprises a guanidine salt.

In another embodiment, the admixture composition comprises a zinc salt.

In a final embodiment, the admixture composition comprises a guanidine salt and a zinc salt.

The zinc and thiocyanate salts as well as the polymer (P) are as described above.

The present application also relates to the use of the admixture composition for the preparation of a hydraulic binder composition as defined above, or for the preparation of a hydraulic composition as defined below, by the addition of: the admixture composition to a hydraulic binder composition comprising a hydraulic binder as defined above or to a composition comprising a hydraulic binder as defined above, water and optionally at least one aggregate.

The use of the admixture composition according to the invention makes it possible to enhance the fluidity retention of the hydraulic compositions as compared to the same hydraulic composition when it does not contain the admixture composition.

The guanidine salt may be selected from guanidine thiocyanate, guanidine acetate and guanidine nitrate.

The zinc salt may be selected from zinc chloride and zinc nitrate.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

The amount of admixture composition according to the invention that is used is such that the amount of guanidine salt and/or zinc salt added is between 0.1 and 5% by dry weight, preferably between 1.0 and 2.5% by dry weight, relative to the total weight of hydraulic binder.

The amount of admixture composition according to the invention that is used is such that the amount of polymer (P) is between 0.1 and 3.0% by dry weight of polymer (P), preferably between 0.3 and 1, 0% by dry weight of polymer (P), relative to the total weight of hydraulic binder.

The amount of admixture composition according to the invention that is used is such that: the amount of guanidine salt and/or zinc salt added is between 0.1 and 5% by dry weight, preferably between 1.0 and 2 5% by dry weight, relative to the total weight of hydraulic binder; and the amount of polymer (P) added is between 0.1 and 3.0% by dry weight of polymer (P), preferably between 0.3 and 1.0% by dry weight of polymer (P), relative to the total weight of hydraulic binder.

The present invention also relates to the use of the hydraulic binder composition (HBC) defined above for the preparation of a hydraulic composition (HC).

The invention also relates to a hydraulic composition (HC) comprising (or indeed even constituted of) the hydraulic binder composition (HBC) defined above, water, and optionally at least one aggregate.

The present invention relates to a hydraulic composition (HC) comprising:

- a hydraulic binder comprising at least one aluminosilicate compound, preferably blast furnace slag, and an alkaline or sulphate activator, and a maximum of 10% by weight of clinker, preferably between 0 and 10% by weight of clinker, and optionally mineral additives as described above;
- water;
- optionally at least one aggregate;
- a guanidine salt and/or a zinc salt; and
- a polymer (P) comprising units having the following formulae (I) and (II):

(I)

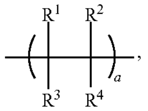

(II)

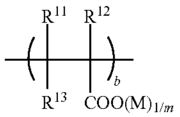

in which:

$R^1$ and $R^2$ independently represent a hydrogen or a methyl;

$R^3$ represents a hydrogen or a group having the formula —$COO(M)_{1/m}$;

$R^4$ represents a group having the formula —$(CH_2)_p$—$(OAlk)_q$-$R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer (P).

The hydraulic binder, the activator, the guanidine and zinc salts, the activator, the mineral additives, as well as the polymer (P) are as defined above.

The present invention relates to a hydraulic composition (HC) comprising:

- a hydraulic binder comprising blast furnace slag and a maximum of 10% by weight of clinker, preferably between 0 and 10% by weight of clinker, from 0 to 10% by dry weight of activator as described below above, and optionally mineral additives as described above;
- water;
- optionally at least one aggregate;
- a guanidine salt and/or a zinc salt; and
- a polymer (P) comprising units having the following formulae (I) and (II):

(I)

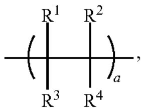

(II)

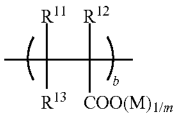

in which:

$R^1$ and $R^2$ independently represent a hydrogen or a methyl;

$R^3$ represents a hydrogen or a group having the formula —$COO(M)_{1/m}$;

$R^4$ represents a group having the formula —$(CH_2)_p$—$(OAlk)_q$-$R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer (P).

The hydraulic binder, the guanidine and zinc salts, the activator, the mineral additives, as well as the polymer (P) are as defined above.

The hydraulic composition may also comprise a polyalkoxylated polyphosphonate based polymer, preferably in a proportion of between 0.1 and 3.0% by dry weight relative to the total weight of hydraulic binder, preferably from 0.3 to 1.0% by dry weight. This polymer is as described above.

In one embodiment, the hydraulic composition comprises a guanidine salt.

In another embodiment, the hydraulic composition comprises a zinc salt.

In a final embodiment, the hydraulic composition comprises a guanidine salt and a zinc salt.

The amount of guanidine salt and/or zinc salt in the hydraulic composition is between 0.1 and 5% by dry weight, preferably between 1.0 and 2.5% by dry weight, relative to the total weight of hydraulic binder.

The guanidine salt may be selected from guanidine thiocyanate, guanidine acetate and guanidine nitrate.

The zinc salt may be selected from zinc chloride and zinc nitrate.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

Preferably, the hydraulic composition comprises from 0.1 to 3.0% by dry weight of polymer (P), preferably from 0.3 to 1.0% by dry weight of polymer (P), relative to the total weight of hydraulic binder.

Preferably, the hydraulic composition comprises between 0.1 and 5% by dry weight, preferably between 1.0 and 2.5% by dry weight, relative to the total weight of hydraulic binder; and from 0.1 to 3.0% by dry weight of polymer (P), preferably from 0.3 to 1.0% by dry weight of polymer (P), relative to the total weight of hydraulic binder.

The hydraulic composition is preferably a concrete, mortar or screed composition.

The term “aggregates” is used to refer to a set of mineral grains with an average diameter of between 0 and 125 mm. Depending on their diameter, the aggregates are classified into one of the following six families: fillers, grit, sand, gravel, crushed stone and ballast (standard XP P 18-545). The most commonly used aggregates are:

- fillers, which have a diameter of less than 2 mm and for which at least 85% of the aggregates have a diameter of less than 1.25 mm and at least 70% of the aggregates have a diameter of less than 0.063 mm;
- sands having a diameter of between 0 and 4 mm (in the standard 13-242, the diameter may go up to 6 mm);
- gravel having a diameter greater than 6.3 mm;
- crushed stone having a diameter of between 2 mm and 63 mm.

Sands are therefore included in the definition of aggregate according to the invention.

The fillers may, as to origin, be derived in particular from limestone or dolomite.

Yet other additives may also be added to the hydraulic composition (CH) according to the invention, such as anti-air entrainment additives, anti-foaming agents, a curing accelerator or retarder, a rheology modifier, or another fluidifier (“plasticiser” or “superplasticiser”).

In an advantageous manner the inventors have shown that the adding of guanidine salt and/or zinc salt, and polymer (P) according to the invention provides the means for enhancing the retention of fluidity (also referred to as retention of workability) over time, of the hydraulic composition, as compared to the same composition when it does not contain any guanidine salt, zinc salt and polymer (P) according to the invention.

In the context of the present invention, the enhancement in the retention of workability, as measured, for example, by the evolving change in the threshold stress of the hydraulic composition, is preferably long-term, that is to say over a period greater than or equal to 45 minutes, in particular greater than 60 minutes, or indeed even greater than 90 minutes when the composition is used at 20° C. It is therefore desirable to have threshold stresses of the order of 1 to 10 Pa over the same time intervals, that is to say over a period greater than or equal to 45 minutes, in particular greater than 60 minutes, or indeed even greater than 90 minutes when the composition is used at 20° C.

The present application also relates to a composition preparation process for preparing a hydraulic composition according to the invention, in which the guanidine salt and/or zinc salt, as well as the polymer (P), and the optional polyalkoxylated polyphosphonate based polymer, are added to the hydraulic binder.

The present application also relates to a composition preparation process for preparing a hydraulic composition according to the invention in which the guanidine salt and/or zinc salt is/are added to the hydraulic binder, and the polymer (P) and the optional polyalkoxylated polyphosphonate based polymer are added with water, for example to the mixing water.

The hydraulic compositions are prepared in a conventional manner by mixing the aforementioned constituents. The polymer (P) according to the invention, and where appropriate the polyalkoxylated polyphosphonate based polymer, may be added to the components of the hydraulic composition in dry form (generally in powder form) or in a solution, preferably in an aqueous solution. The water in the said aqueous solution may be the mixing water or the pre-wetting water (part of the total water which is used to wet the aggregates prior to the mixing, thus making it possible to simulate the hygrometric state of the aggregates, which are often wet, in a concrete plant or on the construction site.

The present invention also relates to the use of guanidine salts and/or zinc salts, and a polymer comprising units having the following formulae (I) and (II):

(I)

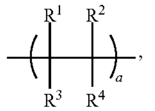

(II)

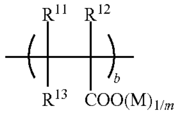

in which:

- $R^1$ and $R^2$ independently represent a hydrogen or a methyl;
- $R^3$ represents a hydrogen or a group having the formula $—COO(M)_{1/m}$;
- $R^4$ represents a group having the formula $—(CH_2)_p—(OAlk)_q-R_5$ in which:
- p represents 1 or 2;
- q represents an integer from 3 to 300;
- the Alk of each OAlk unit of the group $—(OAlk)_q-$ independently represents a linear or branched alkylene containing from 2 to 4 carbon atoms;
- $R^5$ represents —OH or a linear or branched alkoxyl containing from 1 to 4 carbon atoms;
- $R^{11}$ and $R^{12}$ independently represent a hydrogen or a methyl;
- $R^{13}$ represents a hydrogen or a group having the formula $—COO(M)_{1/m}$;
- M represents H or a cation of valency m;
- when M represents H, m represents 1, and when M represents a cation, m is the valency of the cation M;
- a is a number from 0.05 to 0.25, such that (100×a) represents the molar percentage of units having the formula (I) within the polymer; and
- b is a number from 0.75 to 0.95, such that (100×b) represents the molar percentage of units having the formula (II) within the polymer;

for the preparation of a hydraulic composition comprising a hydraulic binder that comprises blast furnace slag and a maximum of 10% by weight of clinker, preferably between 0 and 10.0% by weight of clinker, from 0 to 10% by weight of activator as described above, and optionally mineral additives as described above, water, and optionally at least one aggregate.

The hydraulic binder, the guanidine and zinc salts, the activator, the mineral additives, as well as the polymer (P) are as defined above.

The present invention also relates to the use of guanidine salts and/or zinc salts and a polymer comprising units having the following formulae (I) and (II):

(I)

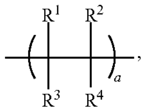

(II)

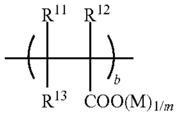

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q-R_5$ in which:

p represents 1 or 2;

q represents an integer from 3 to 300;

the Alk of each OAlk unit of the group $—(OAlk)_q-$ independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula $—COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer, in order to enhance the fluidity, in particular the retention of workability, of a hydraulic composition comprising a hydraulic binder that comprises at least one alumino-silicate compound, preferably blast furnace slag, an alkaline or sulphate activator, and a maximum of 10% by weight of clinker, preferably between 0 and 10.0% by weight of clinker, and optionally mineral additives as described above, water, and optionally at least one aggregate.

The hydraulic binder, the guanidine and zinc salts, the activator, the mineral additives, as well as the polymer (P) are as defined above.

In one embodiment, only a guanidine salt is used.

In another embodiment, only a zinc salt is used.

In a final embodiment, a guanidine salt and a zinc salt are used.

The amount of guanidine salt and/or zinc salt added to the hydraulic composition is between 0.1 and 5% by dry weight, preferably between 1.0 and 2.5% by dry weight, relative to the total weight of hydraulic binder.

The guanidine salt may be selected from guanidine thiocyanate, guanidine acetate and guanidine nitrate.

The zinc salt may be selected from zinc chloride and zinc nitrate.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

Preferably, the amount of polymer (P) added to the hydraulic composition is between 0.1 and 3.0% by dry weight of polymer (P), preferably from 0.3 to 1.0% by dry weight of polymer (P), relative to the total weight of hydraulic binder.

Preferably, the following are added to the hydraulic composition (HC): between 0.1 and 5% by dry weight, preferably between 1.0 and 2.5% by dry weight, of guanidine salt and/or zinc salt relative to the total weight of hydraulic binder; and 0 1 to 3.0% by dry weight of polymer (P), preferably from 0.3 to 1.0% by dry weight of polymer (P), relative to the total weight of hydraulic binder.

In an advantageous manner, the use according to the invention provides the means for enhancing the retention of fluidity (also referred to as retention of workability) over time, of the hydraulic composition, as compared to the same hydraulic composition when it does not contain the guanidine or zinc salts and the polymer of the invention. This enhancement in the retention of fluidity is as described above.

In an advantageous manner, a polyalkoxylated polyphosphonate based polymer as described above may also be added, in particular in the proportions as mentioned above.

The present invention also relates to the use of guanidine salts and/or zinc salts and a polymer comprising units having the following formulae (I) and (II):

(I)

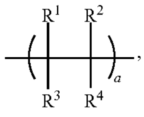

(II)

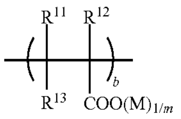

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q-R_5$ in which:

p represents 1 or 2;

q represents an integer from 3 to 300;

the Alk of each OAlk unit of the group $—(OAlk)_q-$ independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula $—COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer;

for the preparation of a hydraulic composition comprising a hydraulic binder that comprises blast furnace slag and a maximum of 10% by weight of clinker, preferably between 0 and 10.0% by weight of clinker, from 0 to 10% by weight of activator as described above, and optionally mineral additives as described above, water, and optionally at least one aggregate.

The hydraulic binder, the guanidine and zinc salts, the activator, the mineral additives, as well as the polymer (P) are as defined above.

The present invention also relates to the use of guanidine salts and/or zinc salts and a polymer comprising units having the following formulae (I) and (II):

(I)

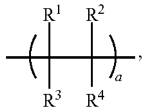

(II)

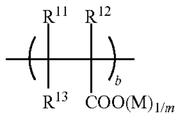

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q\text{-}R_5$ in which:

p represents 1 or 2;

q represents an integer from 3 to 300;

the Alk of each OAlk unit of the group $—(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula $—COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer;

in order to enhance the fluidity, in particular the retention of workability, of a hydraulic composition comprising a hydraulic binder that comprises blast furnace slag and a maximum of 10% by weight of clinker, preferably between 0 and 10.0% by weight of clinker, from 0 to 10% by weight of activator as described above, and optionally mineral additives as described above, water, and optionally at least one aggregate.

The hydraulic binder, the guanidine and zinc salts, the activator, the mineral additives, as well as the polymer (P) are as defined above.

In an advantageous manner, a polyalkoxylated polyphosphonate based polymer as described above may also be added, in particular in the proportions mentioned above.

The present invention also relates to a process for enhancing the retention of fluidity (also referred to as retention of workability) over time of a hydraulic composition comprising a hydraulic binder that comprises at least one aluminosilicate compound, preferably blast furnace slag, an alkaline or sulphate activator, and a maximum of 10% by weight of clinker, preferably between 0 and 10.0% by weight of clinker, and optionally mineral additives as described above, water, and optionally at least one aggregate; which includes the adding of a guanidine salt and/or a zinc salt, and a polymer comprising units having the formulae (I) and (II) as defined above.

This enhancement in the retention of fluidity is as described above.

The present invention also relates to a process for enhancing the retention of fluidity (also referred to as retention of workability) over time of a hydraulic composition comprising a hydraulic binder that comprises blast furnace slag, and a maximum of 10% by weight of clinker, preferably between 0 and 10% by weight of clinker, from 0 to 10% by weight of activator as described above, and optionally mineral additives as described above, water, and optionally at least one aggregate; which includes the adding of a guanidine salt and/or a zinc salt, and a polymer comprising units having the formulae (I) and (II) as defined above.

The hydraulic binder is as defined above.

In a first embodiment, only a guanidine salt is used.

In a second embodiment, only a thiocyanate salt is used.

In a third embodiment a guanidine salt and a thiocyanate salt are used.

Preferably, the process according to the invention includes the adding of 0.1 to 5% by dry weight, preferably from 1.0% to 2.5% by dry weight, relative to the total weight of hydraulic binder, of zinc salt and/or guanidine salt.

Preferably, the process according to the invention includes the adding of 0.1% to 3.0% by dry weight of polymer (P), preferably from 0.3 to 1.0% by dry weight of polymer (P), relative to the total weight of hydraulic binder.

When the guanidine salts and thiocyanate salts are made use of simultaneously, the guanidine salt and thiocyanate salt mixture comprises between 30 and 50% by dry weight of guanidine salt and between 50 and 70% by dry weight of zinc salt.

Preferably, the process according to the invention includes the adding of from 0.1 to 5% by dry weight, preferably from 1.0% to 2.5% by dry weight, relative to the total weight of hydraulic binder, of zinc salt and/or guanidine salt; and the adding of 0.1% to 3.0% by dry weight of polymer (P), preferably from 0.3 to 1.0% by dry weight of polymer (P), relative to the total weight of hydraulic binder.

The zinc and guanidine salts, and the polymer (P) are as described above.

The activator and mineral additives are as described above.

The process of the invention may further include the adding of polyalkoxylated polyphosphonate based polymers, preferably in a proportion of between 0.1 and 3.0% by weight relative to the total weight of hydraulic binder, preferably from 0.3 to 1.0% by weight. These polymers are as described above.

The guanidine and zinc salts may be added to the hydraulic binder and the polymer and optional polyalkoxylated polyphosphonate based polymer is added in water, referred to as mixing water. The polymer (P) according to the invention, and where appropriate the polyalkoxylated polyphosphonate based polymer, may be added to the components of the hydraulic composition in dry form (generally in powder form) or in a solution, preferably in an aqueous solution. The water in the said aqueous solution may be the mixing water or the pre-wetting water (part of the total water which is used to wet the aggregates prior to the mixing, thus making it possible to simulate the hygrometric state of the aggregates, which are often wet, in a concrete plant or on the construction site.

The guanidine and zinc salts, as well as the polymer (P), and the optional polyalkoxylated polyphosphonate based polymer may be added to the hydraulic binder.

DETAILED DESCRIPTION

The present invention will now be described making use of the examples below.

Example 1

Study of the Performance of an Admixture Composition According to the Invention with Guanidine Salt In order to evaluate the performance of a polymeric admixture and guanidine salt composition, a mortar composition was prepared.
The mortar composition is as follows

TABLE 1

| Component | Weight (g) |
|---|---|
| Hydraulic binder (blast furnace slag + activator (7% by weight of sodium silicate)) | 210 |
| Palvadeau sand 0/0.315 mm | 190 |
| Tap water | 84 |

It was prepared, making use of a KENWOOD KM01 1 CHEF TITANIUM mixer with a stainless steel bowl (4.6 litre capacity) and a metal agitation/stirring blade in the shape of a sage leaf (height 13 cm and width 13.6 cm), in the following manner:

1. The water and the admixture are weighed into the mixer bowl, and then the mixer is started at a speed of 43 revolutions per minute (rpm).
2. The timer is started and the hydraulic composition of blast furnace slag and sand is introduced into the bowl in 30 seconds.
3. The speed is increased to 96 rpm and the mixture is mixed for a period of one minute.
4. The mixer is stopped for a period of 30 seconds and any mortar composition splashed onto the walls is scraped back towards the centre with a spatula.
5. The mortar composition obtained is mixed for a period of one minute at 96 rpm.

At the end of the mixing, the mortar composition obtained, which is in the form of a paste, is poured into the cylindrical measuring cell of a Kinexus Pro rheometer (Netzsch) which is provided with a fin-type measuring geometry.

Five minutes after the start of mixing, the mortar composition is subjected to a pre-shear for one minute at a strain rate of 200 $s^{-1}$. The mortar composition is subsequently subjected to a series of descending increments of strain rate, in logarithmic steps from 200 to 0.01 $s^{-1}$, and the rheometer records the stress to be applied at each point. This then enables a flow curve to be generated linking the stress applied in order to obtain each strain rate value. These flow curves show a minimum stress which is interpreted as a threshold stress, that is to say a minimum stress to be applied so as to cause flow. This value varies inversely to the fluidity, which is why it is desirable for it to be reduced as much as possible.

The flow curve is then measured every 30 minutes until 120 minutes after the start of mixing in order to monitor the change in fluidity over time.

The polymer 2 (polymer according to the invention with a=0.2, q=114, R1=R3=R11=R13=H, R2=R12=CH3, M=Na) is introduced into the mortar compositions in a dosed amount of 0.5% by dry weight relative to the total weight of hydraulic binder. The proportions of salts are given in dry weight relative to the total weight of hydraulic binder. The results obtained are as follows:

TABLE 2

| | Threshold stress values (Pa) | | | | |
|---|---|---|---|---|---|
| | 5 min | 30 min | 60 min | 90 min | 120 min |
| Polymer 2 | 4.5 | 51.8 | 95.7 | Non measurable | Non measurable |
| Polymer 2 + 0.5% by dry weight guanidine thiocyanate | 6.1 | 66.2 | 77.0 | 98.3 | 125.5 |
| Polymer 2 + 1.0% by dry weight guanidine thiocyanate | 5.0 | 44.7 | 55.9 | 74.0 | 94.2 |
| Polymer 2 + 2.0% by dry weight guanidine thiocyanate | 5.5 | 27.1 | 26.2 | 28.9 | 32.9 |
| Polymer 2 + 1.4% by dry weight sodium thiocyanate (equimolar 2.0% guanidine thiocyanate) | 13.9 | 101.6 | 114.9 | 136.7 | 167.2 |
| Guanidine thiocyanate 2.0% dry weight | 25.6 | 76.2 | 83.6 | 93.6 | 105.5 |

TABLE 3

| | Threshold stress values (Pa) | | | | |
|---|---|---|---|---|---|
| | 5 min | 30 min | 60 min | 90 min | 120 min |
| Polymer 2 | 4.5 | 51.8 | 95.7 | Non measurable | Non measurable |
| Polymer 2 + guanidine acetate (guanidine in isomolar amount relative to 1% by dry weight of guanidine thiocyanate) | 8.3 | 23.4 | 22.4 | 25.2 | 28.5 |
| Polymer 2 + guanidine nitrate (guanidine in isomolar amount relative to 1% by dry weight of guanidine thiocyanate) | 4.3 | 58.3 | 58.3 | 71.2 | 91.0 |

TABLE 3-continued

| Threshold stress values (Pa) | | | | | |
|---|---|---|---|---|---|
| | 5 min | 30 min | 60 min | 90 min | 120 min |
| Guanidine acetate without Polymer 2 (guanidine in isomolar amount relative to 1% by dry weight of guanidine thiocyanate) | 30.7 | 74.8 | 77.7 | 83.1 | 90.4 |

These results clearly demonstrate the synergistic effect between the polymer of the invention and the guanidine salt such as to enhance the retention of fluidity of the hydraulic binder composition.

Example 2

Study of the Performance of an Admixture Composition According to the Invention with Zinc Salt The evaluation of performance is carried out in the same manner as in Example 1 with the same mortar composition.

The polymer 2 (polymer according to the invention with a=0.2, q=114, R1=R3=R11=R13=H, R2=R12=CH3, M=Na) is introduced into the mortar compositions in a dosed amount of 0.5% by dry weight relative to the total weight of hydraulic binder. The proportions of salts are given in dry weight relative to the total weight of hydraulic binder. The results are presented here below:

TABLE 4

| Threshold stress values (Pa) | | | | | |
|---|---|---|---|---|---|
| | 5 min | 30 min | 60 min | 90 min | 120 min |
| Polymer 2 | 4.5 | 51.8 | 95.7 | Non measurable | Non measurable |
| Polymer 2 + zinc chloride 0.5% by dry weight | 11.7 | 12.4 | 39.7 | 59.9 | 78.9 |
| Polymer 2 + zinc chloride 1.0% by dry weight | 62.5 | 25.6 | 22.3 | 25.0 | 32.3 |
| Polymer 2 + zinc nitrate in isomolar amount zinc chloride 0.5% by dry weight | 11.9 | 8.5 | 28.6 | 46.6 | 64.1 |
| Polymer 2 + zinc nitrate in isomolar amount guanidine thiocyanate 2.0% by dry weight | 63.7 | 30.4 | 26.8 | 26.2 | 27.3 |
| Zinc chloride 1.0% without polymer 2 by dry weight | 55.3 | 44.6 | 39.8 | 38.0 | 38.6 |

These results clearly demonstrate the synergistic effect between the polymer of the invention and the zinc salt such as to enhance the retention of fluidity of the hydraulic binder composition.

Example 3

Study of the Performance of an Admixture Composition According to the Invention with Zinc Salt and Guanidine Salt The evaluation of performance is carried out in the same manner as in Example 1 with the same mortar composition.

The polymer 2 (polymer according to the invention with a=0.2, q=114, R1=R3=R11=R13=H, R2=R12=CH3, M=Na) is introduced into the mortar compositions in a dosed amount of 0.5% by dry weight relative to the total weight of hydraulic binder. The proportions of salts are given in dry weight relative to the total weight of hydraulic binder. The results are presented here below:

TABLE 5

| Threshold stress values (Pa) | | | | | |
|---|---|---|---|---|---|
| | 5 min | 30 min | 60 min | 90 min | 120 min |
| Polymer 2 | 4.5 | 51.8 | 95.7 | Non measurable | Non measurable |
| Polymer 2 + guanidine thiocyanate 1% by dry weight | 5.0 | 44.7 | 55.9 | 74.0 | 94.2 |
| Polymer 2 + zinc nitrate 1.5% by dry weight | 11.9 | 8.5 | 28.6 | 46.6 | 64.1 |
| Polymer 2 + guanidine thiocyanate 1% + zinc nitrate 1.5% by dry weight | 14.5 | 6.7 | 9.5 | 15.1 | 16.7 |

These results clearly demonstrate the synergistic effect between the polymer of the invention and the combination of a zinc salt and a guanidine salt such as to enhance the retention of fluidity of the hydraulic binder composition.

The invention claimed is:

1. A hydraulic binder composition comprising:

a hydraulic binder comprising at least one alumino-silicate compound, and an alkaline or sulphate activator and a maximum of 10% by weight of clinker, and optionally an activator;

a guanidine salt and/or a zinc salt;

a polymer (P) comprising units having the following formulae (I) and (II):

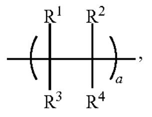

(I)

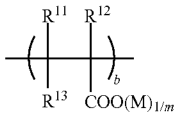

(II)

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q-R_5$ in which:

p represents 1 or 2;

q represents an integer from 3 to 300;

the Alk of each OAlk unit of the group $—(OAlk)_q-$ independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula $—COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

2. The hydraulic binder composition according to claim 1, in which the guanidine salt is selected from guanidine thiocyanate, guanidine acetate and guanidine nitrate.

3. The hydraulic binder composition according to claim 1, in which the activator is selected from a calcium activator or sulpho-calcium activator; or an alkaline salt.

4. The hydraulic binder composition according to claim 1, in which the hydraulic binder composition comprises from 75 to 99% by weight of blast furnace slag, relative to the total weight of hydraulic binder.

5. The hydraulic binder composition according to claim 1, in which the zinc salt is selected from zinc chloride and zinc nitrate.

6. The hydraulic binder composition according to claim 1, in which the units having the formula (I) of the polymer have the following formula (I'):

(I')

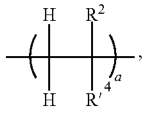

in which:

$R^2$ independently represents a hydrogen or a methyl;

$R'^4$ represents a group having the formula —$CH_2$—(O—$CH_2$—$CH_2$)$_q$-$R_5$ in which:

q represents an integer from 3 to 500;

$R^5$ represents —OH or —OMe;

a is a number from 0.05 to 0.25, such that (100×a) represents the molar percentage of units having the formula (I') within the polymer;

the units having the formula (II) of the polymer have the following formula (II'):

(II')

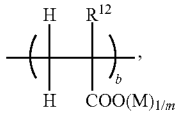

in which:

$R^{12}$ represents a hydrogen or a methyl;

M represents H or a cation of valency m;

when M represents H, m represents 1, and when M represents a cation, m is the valency of the cation M;

b is a number from 0.75 to 0.95, such that (100×b) represents the molar percentage of units having the formula (II') within the polymer.

7. The hydraulic binder composition according to claim 1, in which the amount of guanidine salt and/or zinc salt is between 0.1 and 5% by dry weight, relative to the total weight of hydraulic binder.

8. The hydraulic binder composition according to claim 1, in which the amount of polymer is between 0.1 and 3% by dry weight, relative to the total weight of hydraulic binder.

9. The hydraulic binder composition according to claim 1, comprising in addition at least one polyalkoxylated polyphosphonate based polymer.

10. The hydraulic binder composition according to claim 1, in which the alumino-silicate compound is selected from fly ash; metakaolins; and aluminosilicates.

11. The hydraulic binder composition according to claim 1, in which the alumino-silicate compound is a blast furnace slag.

12. A hydraulic composition comprising:

a hydraulic binder that comprises at least one alumino-silicate compound, and an alkaline or sulphate activator, and a maximum of 10% by weight of clinker, and optionally mineral additives;

water;

optionally at least one aggregate;

a guanidine salt and/or a zinc salt; and a polymer (P) comprising units having the following formulae (I) and (II):

(I)

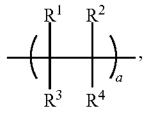

(II)

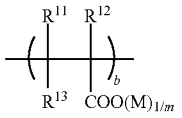

in which:

$R^1$ and $R^2$ independently represent a hydrogen or a methyl;

$R^3$ represents a hydrogen or a group having the formula —$COO(M)_{1/m}$;

$R^4$ represents a group having the formula —$(CH_2)_p$—$(OAlk)_q$-$R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

13. The hydraulic composition according to claim 12, in which the guanidine salt is selected from guanidine thiocyanate, guanidine acetate and guanidine nitrate.

14. The hydraulic composition according to claim 12, in which the zinc salt is selected from zinc chloride and zinc nitrate.

15. The hydraulic composition according to claim 12, in which the units having the formula (I) of the polymer have the following formula (I'):

(I')

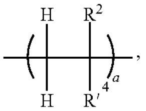

in which:

$R^2$ independently represents a hydrogen or a methyl;

$R'^4$ represents a group having the formula $—CH_2—(O—CH_2—CH_2)_q-R_5$ in which:

q represents an integer from 3 to 500;

$R^5$ represents —OH or —OMe;

a is a number from 0.05 to 0.25, such that (100×a) represents the molar percentage of units having the formula (I') within the polymer;

the units having the formula (II) of the polymer have the following formula (II'):

(II')

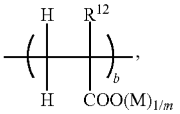

in which:

$R^{12}$ represents a hydrogen or a methyl;

M represents H or a cation of valency m;

when M represents H, m represents 1, and when M represents a cation, m is the valency of the cation M;

b is a number from 0.75 to 0.95, such that (100×b) represents the molar percentage of units having the formula (II') within the polymer.

16. The hydraulic composition according to claim 12, in which the amount of guanidine salt and/or zinc salt is between 0.1 and 5% by dry weight, relative to the total weight of hydraulic binder.

17. The hydraulic composition according to claim 12, in which the alumino-silicate compound is a blast furnace slag.

18. A process for enhancing the retention of fluidity over time of a hydraulic composition comprising a hydraulic binder that comprises at least one alumino-silicate compound, and an alkaline or sulphate activator, and a maximum of 10% by weight of clinker, water, and optionally at least one aggregate; including the adding of a guanidine salt and/or a zinc salt, and a polymer (P) comprising units having the following formulae (I) and (II):

(I)

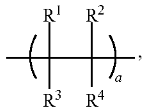

-continued (II)

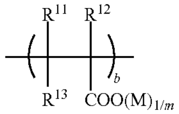

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q-R_5$ in which:

p represents 1 or 2;

q represents an integer from 3 to 300;

the Alk of each OAlk unit of the group $—(OAlk)_q-$ independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula $—COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

19. The process according to claim 18, in which the guanidine salt and/or the zinc salt is/are added to the hydraulic binder, and the polymer is added to the water; or in which the guanidine salt and/or the zinc salt, and the polymer are added to the hydraulic binder.

20. An admixture composition comprising:

a guanidine salt and/or a zinc salt;

a polymer comprising units having the following formulae (I) and (II):

(I)

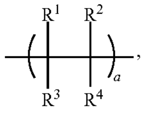

(II)

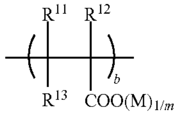

in which:

$R^1$ and $R^2$ independently represent a hydrogen or a methyl;

$R^3$ represents a hydrogen or a group having the formula $—COO(M)_{1/m}$;

$R^4$ represents a group having the formula $—(CH_2)_p—(OAlk)_q-R_5$ in which:

p represents 1 or 2;

q represents an integer from 3 to 300;

the Alk of each OAlk unit of the group —$(OAlk)_q$- independently represents a linear or branched alkylene containing from 2 to 4 carbon atoms;

$R^5$ represents —OH or a linear or branched alkoxyl containing from 1 to 4 carbon atoms;

$R^{11}$ and $R^{12}$ independently represent a hydrogen or a methyl;

$R^{13}$ represents a hydrogen or a group having the formula —$COO(M)_{1/m}$;

M represents H or a cation of valency m;

when M represents H, m represents 1, and when M represents a cation, m is the valency of the cation M;

a is a number from 0.05 to 0.25, such that (100×a) represents the molar percentage of units having the formula (I) within the polymer; and b is a number from 0.75 to 0.95, such that (100×b) represents the molar percentage of units having the formula (II) within the polymer.

* * * * *